(12) United States Patent
Jung et al.

(10) Patent No.: US 7,301,861 B2
(45) Date of Patent: Nov. 27, 2007

(54) COMA ABERRATION CORRECTING APPARATUS FOR OPTICAL PICKUP

(75) Inventors: Jae-hyun Jung, Anyang (KR); Jun-bo Kim, Seoul (KR); Min Hong, Seoul (KR); Young-su Ryu, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 815 days.

(21) Appl. No.: 10/691,545

(22) Filed: Oct. 24, 2003

(65) Prior Publication Data

US 2004/0105360 A1    Jun. 3, 2004

(30) Foreign Application Priority Data

Nov. 29, 2002  (KR) .................... 10-2002-0075343

(51) Int. Cl.
  *G11B 7/00* (2006.01)
(52) U.S. Cl. .................................. 369/44.32
(58) Field of Classification Search ............ None
  See application file for complete search history.

(56) References Cited

U.S. PATENT DOCUMENTS

| | | | |
|---|---|---|---|
| 5,623,466 A | 4/1997 | Itonaga | |
| 5,699,340 A | 12/1997 | Lee et al. | |
| 6,728,185 B2 * | 4/2004 | Terashi et al. | 369/53.28 |
| 7,054,236 B2 * | 5/2006 | Kawano | 369/44.16 |

FOREIGN PATENT DOCUMENTS

| | | |
|---|---|---|
| EP | 0 820 056 A1 | 1/1998 |
| JP | 04-061419 | 2/1992 |
| JP | 6-243478 | 9/1994 |
| JP | 06-318340 | 11/1994 |
| JP | 11-203683 | 7/1999 |
| JP | 11-238246 | 8/1999 |
| JP | 11-250491 | 9/1999 |
| JP | 2002-15435 | 1/2002 |
| KR | 1996-0032345 | 9/1996 |
| KR | 1998-67551 | 10/1998 |

(Continued)

OTHER PUBLICATIONS

Office Action issued on Aug. 30, 2005 by the Japanese Patent Office.

*Primary Examiner*—Wayne Young
*Assistant Examiner*—Lixi Chow
(74) *Attorney, Agent, or Firm*—Staas & Halsey LLP

(57) ABSTRACT

A coma aberration correcting apparatus of an optical pickup includes an optical pickup main body having a photo diode, and an actuator mounted on an objective lens focusing a beam emitted from the photo diode onto a recording medium. The coma aberration correcting apparatus includes a main supporting unit, a holding unit, an optical system, a driving part, and a controller. The main supporting unit detachably supports the optical pickup main body. The holding unit holds and releases the actuator on the optical pickup main body supported by the main supporting unit. The optical system magnifies and photographs the beam emitted from the photo diode through the objective lens of the actuator held by the holding unit. The driving part adjusts a position of the actuator relative to the optical pickup main body. The controller controls the driving part to correct the coma aberration of the objective lens.

21 Claims, 6 Drawing Sheets

FOREIGN PATENT DOCUMENTS

| | | |
|---|---|---|
| KR | 0171493 | 10/1998 |
| KR | 10-0188931 | 1/1999 |
| KR | 1999-0037764 | 5/1999 |
| KR | 10-0230250 | 8/1999 |
| KR | 2000-0047946 | 7/2000 |
| KR | 2002-0004818 | 1/2002 |
| KR | 2002-0020240 | 3/2002 |
| KR | 2002-0028003 | 4/2002 |
| KR | 2002-0071817 | 9/2002 |

* cited by examiner

COMA ABERRATION CORRECTING APPARATUS FOR OPTICAL PICKUP

CROSS-REFERENCE TO RELATED APPLICATIONS

This application claims the benefit of Korean Patent Application No. 2002-75343, filed Nov. 29, 2002, in the Korean Intellectual Property Office, the disclosure of which is incorporated herein by reference.

BACKGROUND OF THE INVENTION

1. Field of the Invention

The present invention relates to a coma aberration correcting apparatus for an optical pickup, and more particularly, to a coma aberration correcting apparatus for an optical pickup, including an optical pickup main body having a photo diode, and an actuator mounted on an objective lens focusing a beam emitted from the photo diode.

2. Description of the Related Art

Generally, an optical pickup reads or writes data on a recording medium, such as a CD (compact disk) in an optical device, such as a CD-ROM (compact disk read only memory) drive, a CD-RW (compact disk rewritable) drive, a DVD (digital versatile disk) drive, etc.

The optical pickup includes an optical pickup main body having a photo diode emitting a laser beam, and an actuator mounted on an objective lens to focus the laser beam emitted from the photo diode onto the recording medium.

If the objective lens is mounted onto the optical pickup main body in an inclined state or in a wrong position, the beam emitted from the photo diode is not properly focused onto the recording medium, making it impossible to read or write data on the recording medium. Further, a coma aberration is one of the chief causes that makes the objective lens to not focus the laser beam from the photo diode onto the recording medium.

The coma aberration causes the laser beam emitted from the photo diode to not be focused at a point and looks like a comet-shaped image when the laser beam goes through the objective lens off from an optical axis at an angle.

Therefore, in order to focus the laser beam emitted from the photo diode onto the recording medium, there has been proposed a device to reduce the coma aberration when the objective lens is mounted onto the optical pickup main body.

FIGS. 1 and 2 are perspective views of a conventional coma aberration correcting apparatus for the optical pickup. As shown in FIGS. 1 and 2, the coma aberration correcting apparatus 101 includes a main base 103 to be seated on a plane, such as a table, a main supporting unit 120 detachably supporting an optical pickup main body 151 of an optical pickup 150 (to be described later), a holding unit 130 holding and releasing an actuator 153 put on the optical pickup main body 151 supported by the main supporting unit 120, an optical system 140 magnifying and photographing a laser beam emitted from a photo diode (not shown) through an objective lens 155 of the actuator 153 held by the holding unit 130, and a driving part 110 adjusting a position of the actuator 153 relative to the optical pickup main body 151.

As shown in FIG. 2, the optical pickup 150 includes the optical pickup main body 151 having the photo diode emitting the laser beam, and the actuator 153 mounted on the objective lens 155 focusing the laser beam emitted from the photo diode onto a recording medium (not shown), such as a CD.

The optical pickup main body 151 is firmly supported by the main supporting unit 120, and includes a pair of projections 157 to be combined with the actuator 153 in a state where the optical pickup main body 151 is supported by the main supporting unit 120, and a through hole 158 through which the holding unit 130 passes so as to hold the actuator 153 from below.

The actuator 153 is mounted on the objective lens 155 focusing the laser beam onto the recording medium, and is combined with the projections 157 of the optical pickup main body 151 by soldering after the position of the actuator 153 is adjusted by the coma aberration correcting apparatus 101 to correct the coma aberration of the objective lens 155. Herein, the actuator 153 is made of a magnetizable material so as to be attached to a holding part 131 of the holding unit 130 by a magnetic force.

As shown in FIG. 2, the main supporting unit 120 includes a main supporting base 121 shaped like a plate, a base supporter 122 (FIG. 1) having an upper part combined to the main supporting base 121 and a lower part combined to the main base 103 to support the main supporting base 121. The main supporting unit 120 also includes a main body supporter 128 combined onto the main supporting base 121 to support a first part of the optical pickup main body 151, a first cylinder 123 combined with the main supporting base 121 at a predetermined distance from the main body supporter 128 in a side opposite to the main body supporter 128, a slider 125 combined with the first cylinder 123 by a shaft 127 and sliding along a guide 126, and a jig 129 combined with the slider 125 and supporting a second part of the optical pickup main body 151.

The main supporting base 121 is formed with a base through hole 124 through which the holding unit 130 passes to hold the actuator 153 of the optical pickup 150.

The holding unit 130 is provided under the main supporting unit 120, and holds a lower part of the actuator 153. The holding unit 130 includes the holding part 131 holding the actuator 153 by the magnetic force, and a cylinder unit 133 provided adjacent to the holding part 131 to control the magnetic force of the holding part 131.

The holding part 131 is shaped like a bar, and has an upper part passing through the through hole 158 of the optical pickup main body 151 and holds the lower part of the actuator 153 by the magnetic force.

The cylinder unit 133 includes a pinion 138 rotating to control the magnetic force of the holding part 131, a rack 137 engaging to the pinion 138, and a second cylinder 135 provided adjacent to the rack 137 and reciprocating the rack 137 linearly.

Thus, in the holding unit 130, the rack 137 is linearly reciprocated according to an operation of the second cylinder 135. The pinion 138 rotates according to the reciprocating motion of the rack 137 and controls the magnetic force of the holding part 131, thereby allowing the holding part 131 to hold and release the actuator 153.

The optical system 140 includes a low magnification camera 141 and a high magnification camera 143 magnifying and photographing the laser beam emitted from the photo diode through the objective lens 155 of the actuator 153 held on the optical pickup main body 151 by the holding unit 130. The optical system 140 also includes a low magnification monitor 145 and a high magnification monitor 146 respectively displaying pictures transmitted from the low magnification camera 141 and the high magnification camera 143, respectively.

The low magnification camera 141 and the low magnification monitor 145 are generally used to schematically adjust a position of the laser beam emitted from the photo diode through the objective lens 155.

The high magnification camera 143 and the high magnification monitor 146 are generally used to correct the coma aberration of the laser beam emitted from the photo diode through the objective lens 155.

The driving part 110 is provided under the holding unit 130 and is used to adjust the position of the actuator 153, which is held on the optical pickup main body 151 by the holding unit 130, relative to the optical pickup main body 151. As a result, a position of the objective lens 155 mounted to the actuator 153 is adjusted. The driving part 110 includes an X-axis handle 111 and a Y-axis handle 113 to move the actuator 153 horizontally, a Z-axis handle 115 to move the actuator 153 vertically, and an R-axis handle 117 and a T-axis handle 119 to adjust an inclination of the actuator 153.

With the configuration described for FIGS. 1 and 2, the conventional coma aberration correcting apparatus 101 of the optical pickup 150 operates as follows.

First, the optical pickup main body 151 of the optical pickup 150 is placed on the main supporting unit 120 and is firmly supported according to an operation of the first cylinder 123. Then, the actuator 153 mounted on the objective lens 155 is put on the optical pickup main body 151 and the lower part of the actuator 153 is held by the holding part 131 according to an operation of the second cylinder 135 of the holding unit 130.

Then, a worker controls the X- and Y-axis handles 111 and 113 until the laser beam emitted from the photo diode through the objective lens 155 of the actuator 153 is displayed on the low magnification monitor 145 to display a picture photographed by the low magnification camera 141. When the beam from the photo diode is displayed on the low magnification monitor 145, the worker controls the X-, Y- and Z-axis handles 111, 113 and 115 so as to adjust a focus and a position of the laser beam from the photo diode. Further, in order to finely adjust the focus and the position of the laser beam from the photo diode, the worker controls the X-, Y- and Z-axis handles 111, 113 and 115, monitoring the laser beam photographed by the high magnification camera 143 and displayed on the high magnification monitor 146. Thereafter, the worker controls the R- and T-axis handles 117 and 119, monitoring the high magnification monitor 146, thereby correcting the coma aberration. Then, the actuator 153 is adjusted in a position to be combined with the pair of projections 157 of the optical pickup main body 151 by soldering.

Thus, in the conventional coma aberration correcting apparatus 101 for the optical pickup 150, the position of the objective lens 155 mounted to the actuator 153 is adjusted by adjusting the position of the actuator 153 relative to the optical pickup main body 151, thereby correcting the coma aberration of the optical pickup 150.

However, in the conventional coma aberration correcting apparatus 101 for the optical pickup 150, the worker must manually control the driving part 110 so as to combine the actuator 153 having the objective lens 155 with the optical pickup main body 151 without the coma aberration. As a result, the optical pickup 150 cannot be uniformly manufactured and productivity thereof is decreased. Particularly, correcting the coma aberration of the optical pickup 150 requires fine adjustment, creating a need for skilled workers.

SUMMARY OF THE INVENTION

In accordance with an aspect of the present invention, there is provided a coma aberration correcting apparatus for an optical pickup, which allows the optical pickup to be uniformly manufactured and increases productivity of the optical pickup.

Additional aspects and advantages of the invention will be set forth in part in the description which follows and, in part, will be obvious form the description, or may be learned by practice of the invention.

The foregoing and/or other aspects of the present invention are achieved by providing a coma aberration correcting apparatus of an optical pickup including an optical pickup main body having a photo diode, and an actuator mounted on an objective lens focusing a beam emitted from the photo diode onto a recording medium, the coma aberration correcting apparatus including: a main supporting unit detachably supporting the optical pickup main body; a holding unit holding and releasing the actuator on the optical pickup main body supported by the main supporting unit; an optical system magnifying and photographing the beam emitted from the photo diode through the objective lens of the actuator held by the holding unit; a driving part adjusting a position of the actuator relative to the optical pickup main body; and a controller controlling the driving part to correct the coma aberration of the objective lens.

According to an aspect of the invention, the driving part includes an X-axis stage and a Y-axis stage moving the actuator horizontally, a Z-axis stage moving the actuator vertically, and an R-axis stage and a T-axis stage adjusting an inclination of the actuator.

According to an aspect of the invention, the holding unit includes a holding part holding the actuator by a magnetic force, and a cylinder unit adjacent to the holding part and controlling the magnetic force of the holding part.

According to an aspect of the invention, the optical system includes a low magnification camera, and a high magnification camera, wherein the low and high magnification cameras magnify and photograph the beam emitted from the photo diode through the objective lens of the actuator.

According to an aspect of the invention, the controller controls the X-axis and Y-axis stages until the low magnification camera captures the beam, controls the X-axis and Y-axis stages to centrally photograph the beam using the low magnification camera, controls the Z-axis stage to photograph the beam using a low magnification of the low magnification camera, controls the X-axis and Y-axis stages to centrally photograph the beam using the high magnification camera, controls the Z-axis stage to photograph the beam using a maximum brightness of the high magnification camera, and controls the R-axis and T-axis stages to photograph the beam using a minimum coma aberration of the high magnification camera.

According to an aspect of the invention, the controller calculates a coma aberration value based on a centroid difference between beam images having the minimum coma aberration and a beam image having some coma aberration, where the beam images having the minimum coma aberration and the beam image having some coma aberration are captured by the high magnification camera, and determines whether the actuator passes inspection or not by comparing the calculated coma aberration value with a predetermined reference value.

According to an aspect of the present invention, there is provided a coma aberration correcting apparatus of an optical pickup including an optical pickup main body having a photo diode, and an actuator mounted on an objective lens focusing a beam emitted from the photo diode onto a recording medium, the coma aberration correcting apparatus including: a driving part adjusting in an automated manner and without human intervention a position of the actuator relative to the optical pickup main body; and a controller controlling the driving part to correct the coma aberration of the objective lens.

These together with other aspects and advantages which will be subsequently apparent, reside in the details of construction and operation as more fully hereinafter described and claimed, reference being had to the accompanying drawings forming a part thereof, wherein like numerals refer to like parts throughout.

BRIEF DESCRIPTION OF THE DRAWINGS

These and/or other objects and advantages of the invention will become apparent and more readily appreciated from the following description of the embodiments, taken in conjunction with the accompanying drawings of which.

DETAILED DESCRIPTION OF THE INVENTION

Figure 1:
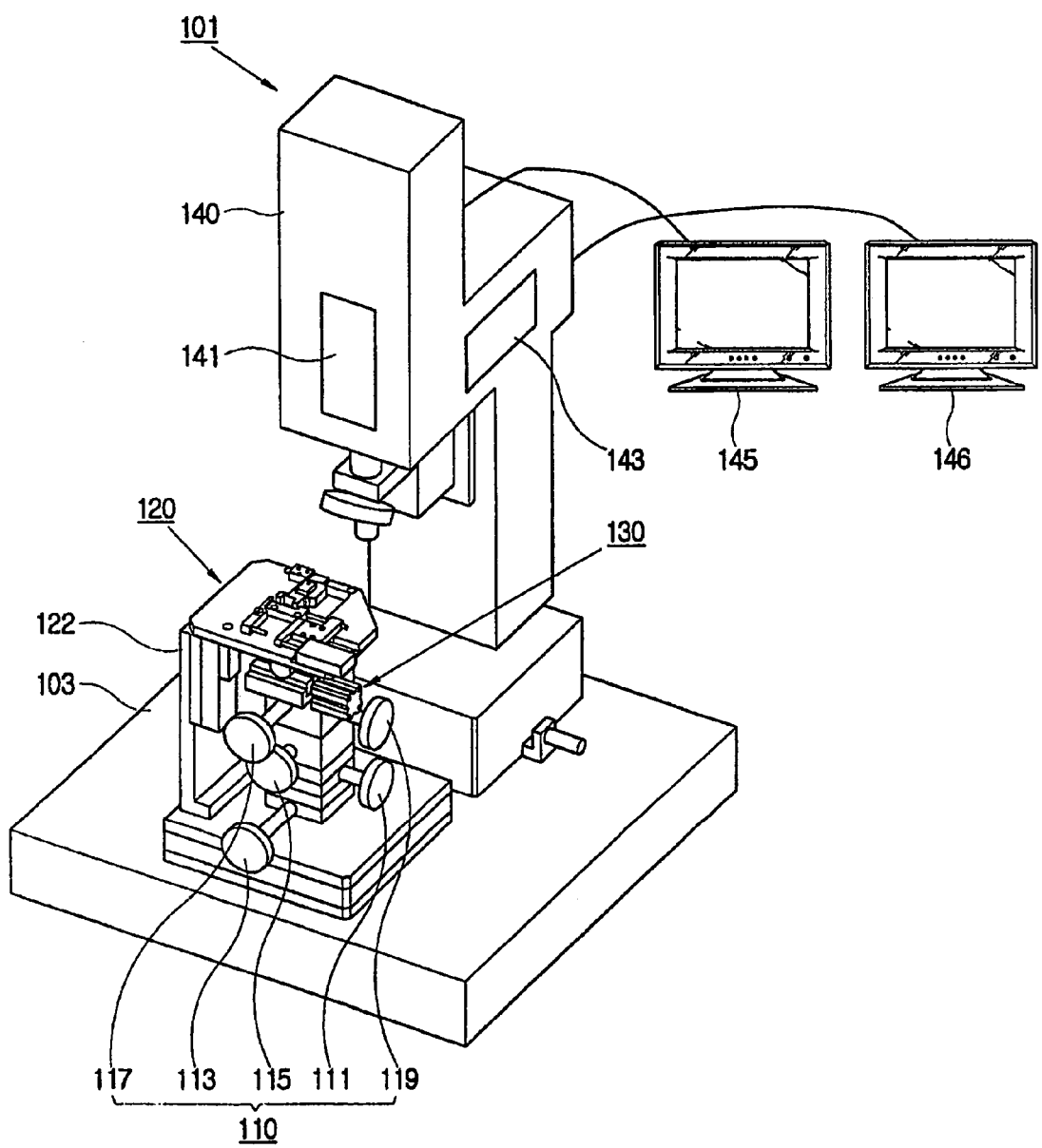
FIG. 1 is a perspective view of a conventional coma aberration correcting apparatus for an optical pickup.
Figure 2:
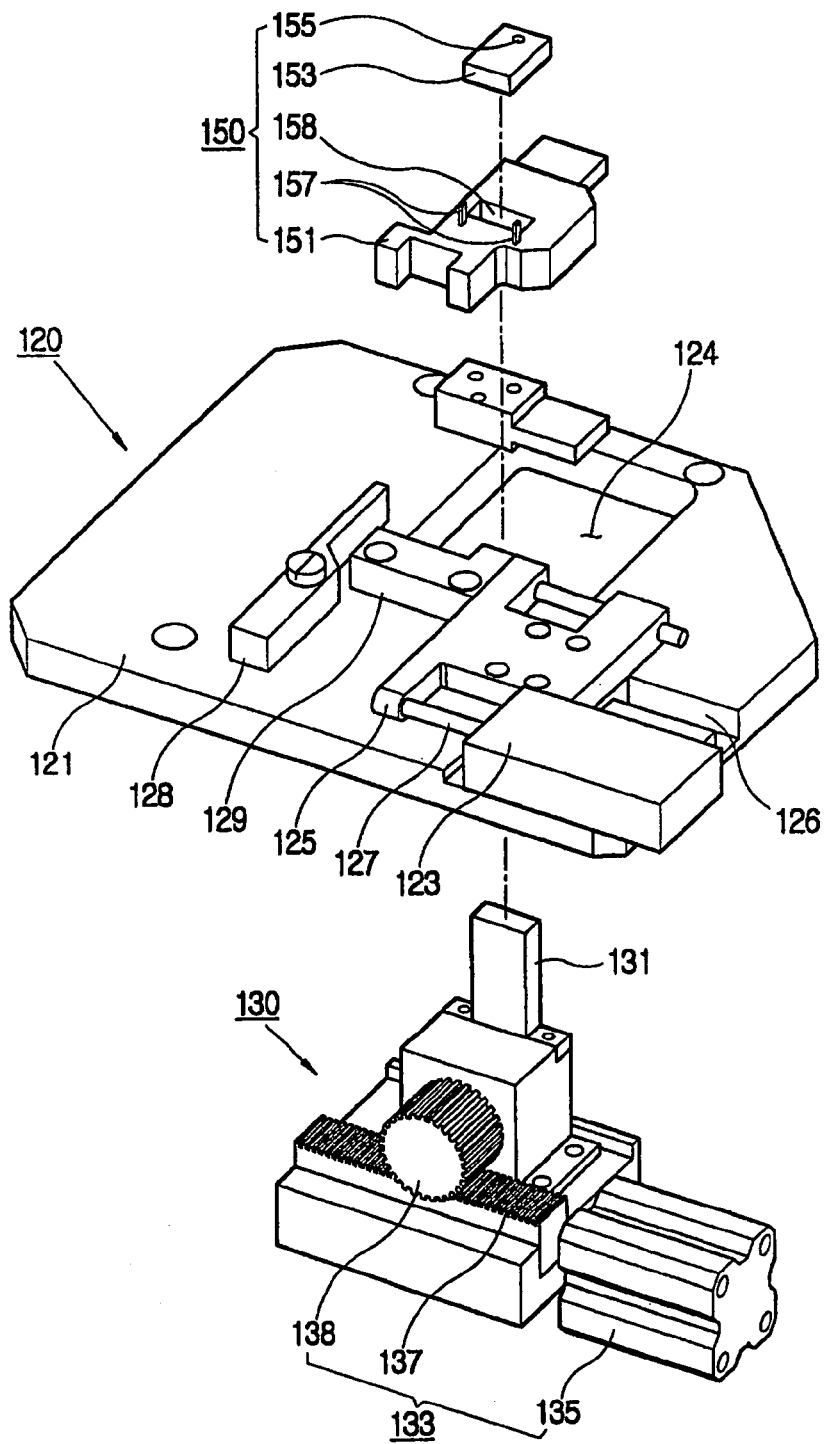
FIG. 2 is a partially exploded perspective view of the coma aberration correcting apparatus for the optical pickup of FIG. 1.

Reference will now be made in detail to the aspects of the present invention, examples of which are illustrated in the accompanying drawings, wherein like reference numerals refer to like elements throughout. The aspects are described below in order to explain the present invention by referring to the figures.

Figure 3:
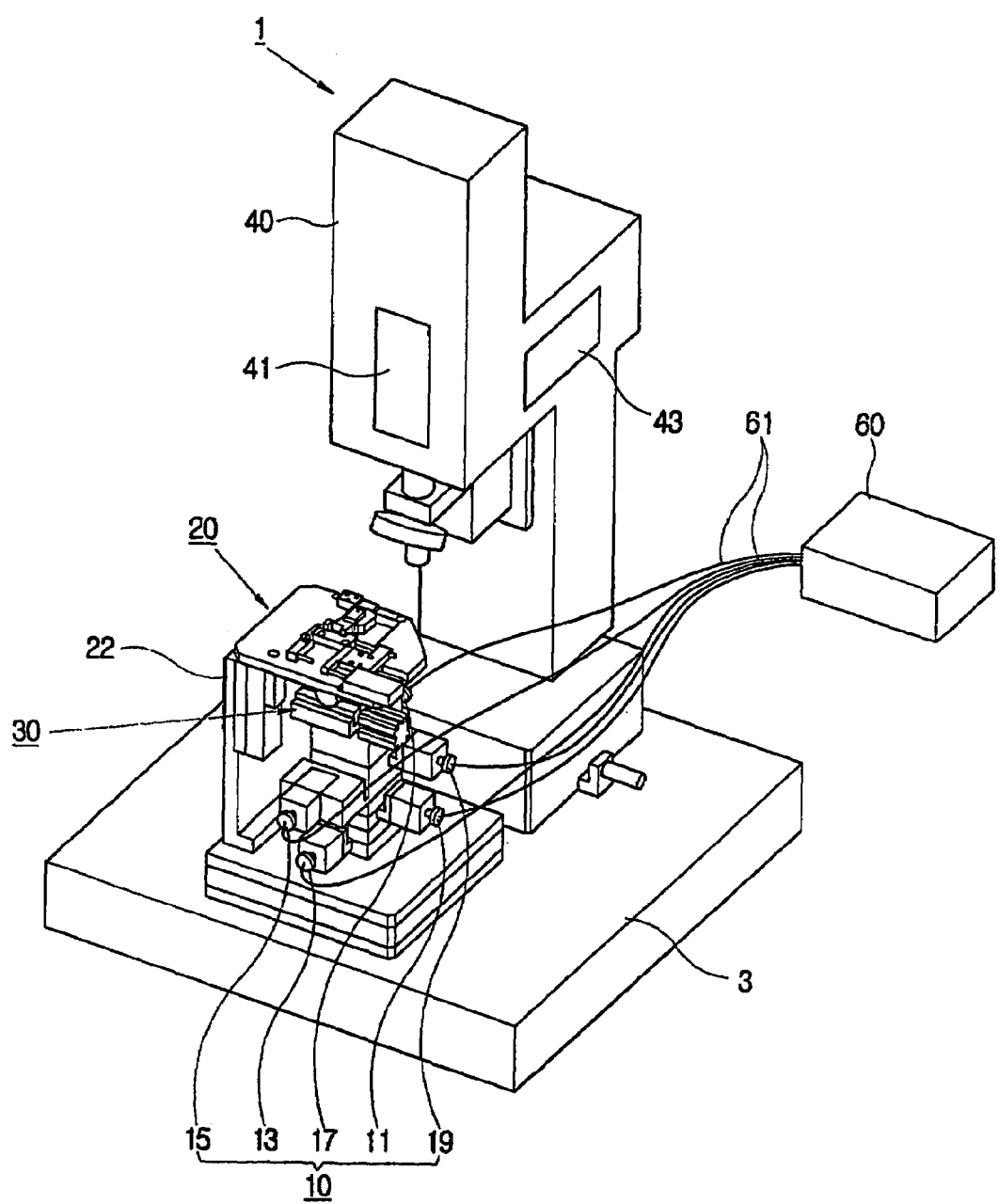
FIG. 3 is a perspective view of a coma aberration correcting apparatus for the optical pickup, according to an aspect of the present invention.
Figure 4:
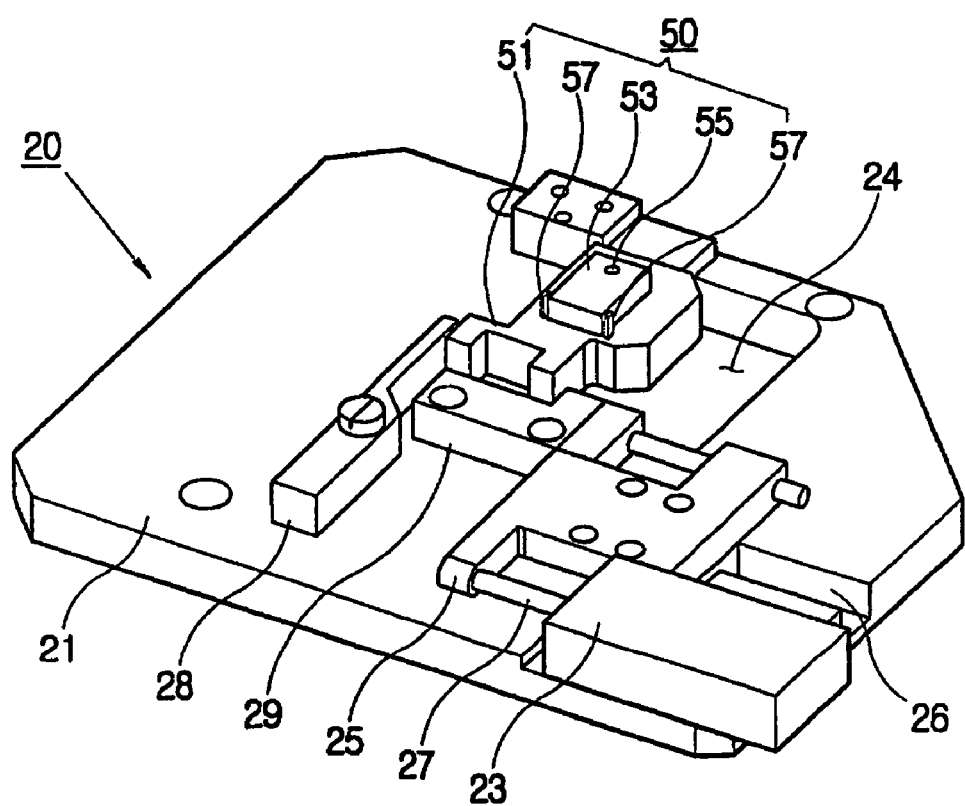
FIG. 4 is a perspective view of a main supporting unit of the coma aberration correcting apparatus for the optical pickup of FIG. 3.
Figure 5:
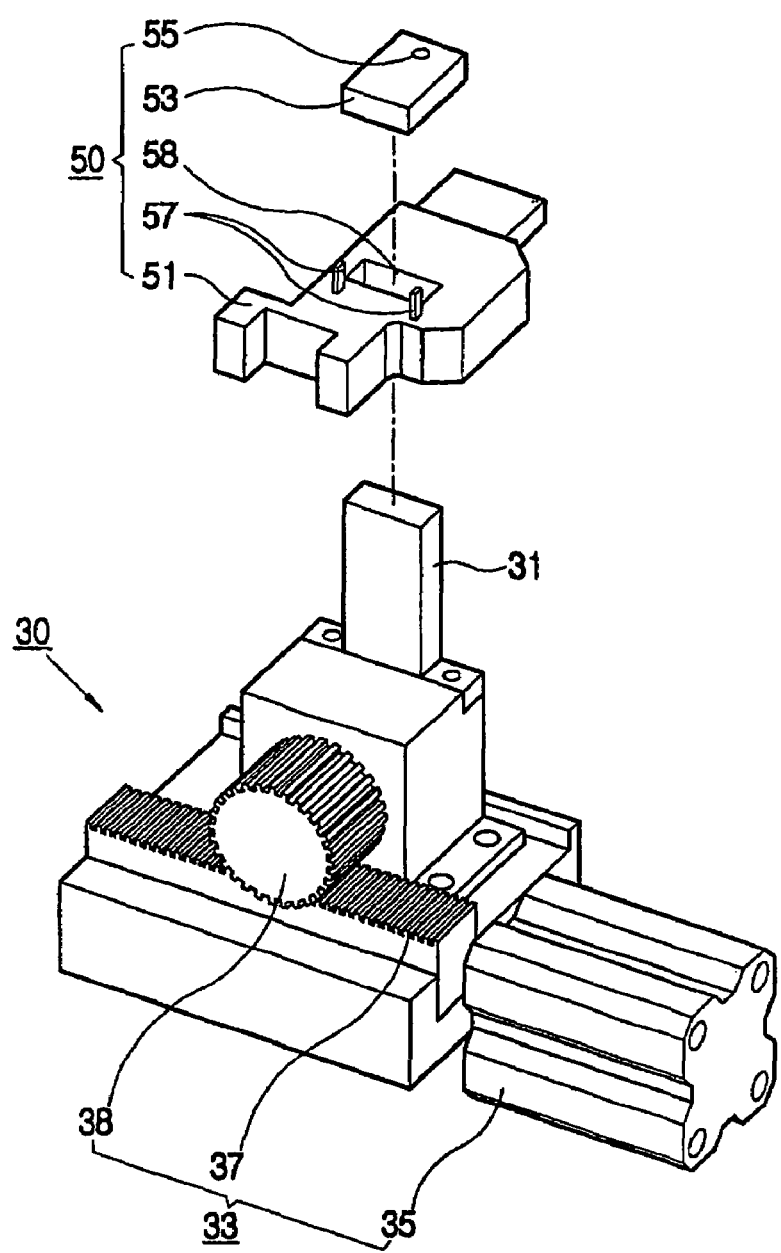
FIG. 5 is a perspective view of a holding unit of the coma aberration correcting apparatus for the optical pickup of FIG. 3.

As shown in FIGS. 3 through 5, according to an aspect of the present invention, a coma aberration correcting apparatus 1 for an optical pickup 50 includes a main base 3 to be seated on a plane such as a table, a main supporting unit 20 detachably supporting an optical pickup main body 51 of the optical pickup 50, a holding unit 30 holding and releasing an actuator 53 placed on the optical pickup main body 51 which is supported by the main supporting unit 20. The coma aberration correcting apparatus 1 also includes an optical system 40 magnifying and photographing a laser beam emitted from a photo diode (not shown) through an objective lens 55 of the actuator 53 which is held by the holding unit 30, a driving part 10 adjusting a position of the actuator 53 relative to the optical pickup main body 51, and a controller 60 controlling the driving part 10 to correct a coma aberration of the objective lens 55 on the basis of an image due to the laser beam emitted from the photo diode in the optical system 40.

The optical pickup 50 includes the optical pickup main body 51 having the photo diode emitting the beam, and the actuator 53 mounted on the objective lens 55 focusing the beam emitted from the photo diode onto a recording medium (not shown), such as a CD.

The optical pickup main body 51 is firmly supported by the main supporting unit 20, and includes a pair of projections 57 operably connected to the actuator 53 in a state when the optical pickup main body 51 is supported by the main supporting unit 20, and a through hole 58 through which the holding unit 30 passes to hold the actuator 53 from below.

The actuator 53 is mounted on the objective lens 55 to focus the beam onto the recording medium. The actuator 53 is operably connected to the projections 57 of the optical pickup main body 51 by soldering, after the position of the actuator 53 is adjusted by the coma aberration correcting apparatus 1, to correct the coma aberration of the objective lens 55. According to an aspect of the present invention, the actuator 53 is made of a magnetizable material allowing the actuator to be attached to a holding part 31 (FIG. 5) of the holding unit 30 by a magnetic force.

The main supporting unit 20 includes a main supporting base 21 shaped like a plate, a base supporter 22 having an upper part operably connected to the main supporting base 21 and a lower part operably connected to the main base 3 to support the main supporting base 21. A main body supporter 28 is operably connected to the main supporting base 21 and supports a first part of the optical pickup main body 51, and a first cylinder 23 is operably connected to the main supporting base 21 at a predetermined distance from the main body supporter 28 in a side opposite to the main body supporter 28. A slider 25 is operably connected to the first cylinder 23 by a shaft 27 and slides along a guide 26, and a jig 29 is operably connected to the slider 25 and supports a second part of the optical pickup main body 51. Further, the main supporting base 21 is formed with a base through hole 24 through which the holding unit 30 passes, to hold the actuator 53 of the optical pickup 50.

The holding unit 30 is provided under the main supporting unit 20, and holds a lower part of the actuator 53. The holding unit 30 includes the holding part 31 (FIG. 5) holding the actuator 53 by the magnetic force, and a cylinder unit 33 (FIG. 5) provided adjacent to the holding part 31 and controlling the magnetic force of the holding part 31.

The holding part 31 is shaped like a bar, and has an upper part passing through a through hole 58 of the optical pickup main body 51 and holding the lower part of the actuator 53 by the magnetic force, and a lower part operably connected to the cylinder unit 33.

The cylinder unit 33 includes a pinion 38 rotating to control the magnetic force of the holding part 31, a rack 37 engaging with the pinion 38, and a second cylinder 35 provided adjacent to the rack 37 and reciprocating the rack 37 linearly.

Thus, in the holding unit 30, the rack 37 is linearly reciprocated according to an operation of the second cylinder 35, and the pinion 38 rotates according to the reciprocating motion of the rack 37 and controls the magnetic force of the holding part 31, thereby allowing the holding part 31 to hold and release the actuator 53.

The optical system 40 includes a low magnification camera 41 and a high magnification camera 43 magnifying and photographing the laser beam emitted from the photo diode through the objective lens 55 of the actuator 53, which is held on the optical pickup main body 51 by the holding unit 30.

The low magnification camera 41 is generally used to schematically adjust a position of the laser beam emitted from the photo diode through the objective lens 55.

The high magnification camera 43 is generally used to correct the coma aberration of the laser beam emitted from the photo diode through the objective lens 55.

The driving part 10 is provided under the holding unit 30, coupled to the controller 60 using cables 61, and controlled to adjust the position of the actuator 53, which is held on the optical pickup main body 51 by the holding unit 30, relative to the optical pickup main body 51, thereby adjusting a position of the objective lens 55 mounted on the actuator 53. The driving part 10 includes an X-axis stage 11 and a Y-axis stage 13 to move the actuator 53 horizontally, a Z-axis stage 15 to move the actuator 53 vertically, and an R-axis stage 17 and a T-axis stage 19 to adjust an inclination of the actuator 53.

The controller 60 is coupled to the X-axis, Y-axis, Z-axis, and R-axis stages 11, 13, 15 and 17 using the cables 61 so as to control the driving part 10 to correct the coma aberration of the objective lens 55. The controller 60 processes and analyzes the beam photographed by the low magnification camera 41 and controls the X-axis and Y-axis stages 11 and 13 until the beam emitted from the photo diode through the objective lens 55 of the actuator 153 is captured by the low magnification camera 41. Further, the controller 60 controls the X-axis, Y-axis, and Z-axis stages 11, 13 and 15 to adjust a focus and a position of the laser beam photographed by the low magnification camera 41. Further, the controller 60 processes and analyzes the beam photographed by the high magnification camera 43, and controls again the X-axis, Y-axis, and Z-axis stages 11, 13 and 15 to finely adjust the focus and the position of the beam from the photo diode. Further, the controller 60 controls the R-axis and T-axis stages 17 and 19 to correct the coma aberration on the basis of the beam photographed by the high magnification camera 43.

Figure 6:
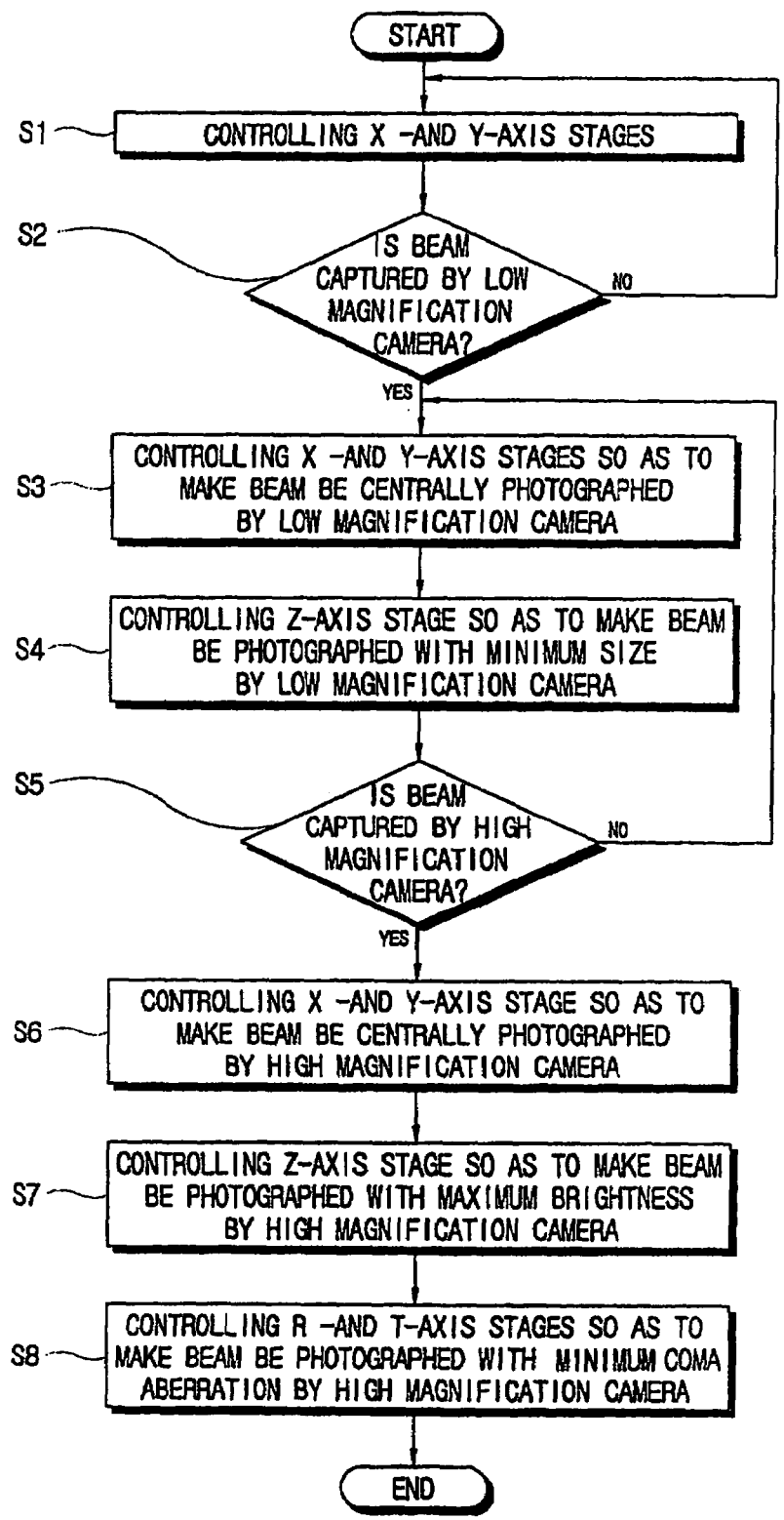
FIG. 6 is a control flowchart of the coma aberration correcting apparatus for the optical pickup, according to an aspect of the present invention.

With this configuration, according to an aspect of the present invention, an operation of the coma aberration correcting apparatus 1 for the optical pickup 50 will be described with reference to FIG. 6.

First, the optical pickup main body 51 of the optical pickup 50 is placed on the main supporting unit 20 and is firmly supported according to operation of the first cylinder 23. Then, the actuator 53 mounted on the objective lens 55 is placed on the optical pickup main body 51 and the lower part of the actuator 53 is held by the holding part 31 according to operation of the second cylinder 35 of the holding unit 30.

Then, at operation S1, the controller 60 controls the X-axis and Y-axis stages 11 and 13 until the laser beam emitted from the photo diode through the objective lens 55 of the actuator 53 is captured by the low magnification camera 41. At operation S2, when the laser beam from the photo diode is captured by the low magnification camera 41 at operation S3, the controller 60 controls the X-axis and Y-axis stages 11 and 13 so as to make the beam from the photo diode to be centrally photographed by the low magnification camera 41. Then, at operation S4, the controller 60 controls the Z-axis stage 15 so as to make the laser beam from the photo diode to be photographed with a low magnification of the low magnification camera 41.

Then, at operation S5, the controller 60 determines whether or not the high magnification camera 43 captures the laser beam from the photo diode. When the high magnification camera 43 does not capture the beam, the controller 60 returns to operation S3. Oppositely, when the high magnification camera 43 captures the beam, at operation S6, the controller 60 finely controls the X-axis and Y-axis stages 11 and 13 so as to make the beam from the photo diode to be centrally photographed by the high magnification camera 43, and at operation S7, the controller 60 finely controls the Z-axis stage 15 so as to make the beam from the photo diode to be photographed with the maximum brightness by the high magnification camera 43. Then, at operation 58, the controller 60 controls the R-axis and T-axis stages 17 and 19 to adjust the inclination of the actuator 53 so as to make the laser beam from the photo diode to be photographed with the minimum coma aberration by the high magnification camera 43. Thereafter, the actuator 53 adjusted to the minimum coma aberration is operably connected to the pair of projections 57 of the optical pickup main body 51 by soldering.

Thus, according to an aspect of the present invention, the coma aberration correcting apparatus 1 for the optical pickup 50 automatically, in an automated manner and without human intervention, adjusts the position of the actuator 53 mounted on the objective lens 55 relative to the optical pickup main body 51 so as to correct the coma aberration of the optical pickup 50. Thus, the optical pickup 50 is uniformly manufactured and productivity thereof is increased. Further, the coma aberration correcting apparatus 1 for the optical pickup 50 automatically adjusts the position of the actuator 53 mounted on the objective lens 55 relative to the optical pickup main body 51, so that there is no need of skilled workers and personnel expenses are decreased, thereby decreasing productivity cost.

In the foregoing aspect of the present invention, when the controller 60 controls the R-axis and T-axis stages 17 and 19, the coma aberration instantaneously alternates between appearance and disappearance. At this time, the controller 60 calculates a coma aberration value on a basis of a centroid difference between a beam image having approximately zero coma aberration and a beam image having some coma aberration, which are captured by the high magnification camera 43. Thus, when the calculated coma aberration value is within a predetermined reference value, the actuator 53 adjusted in position passes inspection and is operably connected to the optical pickup main body 51. Oppositely, when the calculated coma aberration value is beyond a predetermined reference value, the controller 60 controls again the X-axis, Y-axis, Z-axis, R-axis and T-axis stages 11, 13, 15, 17, and 19 until it is determined that the actuator 53 adjusted in position passes inspection.

In the foregoing aspect of the present invention, the controller 60 is connected to the X-axis, Y-axis, Z-axis, R-axis and T-axis stages 11, 13, 15, 17 and 19, and controls the driving part 10 so as to control the driving part 10 to correct the coma aberration of the objective lens 55, wherein the controller may include a computer having a control program.

As described above, the present invention provides a coma aberration correcting apparatus for an optical pickup, which allows the optical pickup to be uniformly manufactured, increases productivity of the optical pickup, and decreases the cost of productivity.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A coma aberration correcting apparatus of an optical pickup including an optical pickup main body having a photo diode, and an actuator mounted on an objective lens focusing a beam emitted from the photo diode onto a recording medium, the coma aberration correcting apparatus comprising:
a main supporting unit detachably supporting the optical pickup main body;
a holding unit holding and releasing the actuator on the optical pickup main body supported by the main supporting unit;
an optical system magnifying and photographing the beam emitted from the photo diode through the objective lens of the actuator held by the holding unit;
a driving part adjusting a position of the actuator relative to the optical pickup main body; and
a controller controlling the driving part to correct the coma aberration of the objective lens by calculating a coma aberration value based on a centroid difference between beam images having minimum coma aberration and a beam image having some coma aberration, where the beam images having the minimum coma aberration and the beam image having some coma aberration are captured by the optical system, and determining whether the actuator passes inspection by comparing the calculated coma aberration value with a predetermined reference value.

2. The coma aberration correcting apparatus according to claim 1, wherein the driving part comprises:
an X-axis stage and a Y-axis stage moving the actuator horizontally,
a Z-axis stage moving the actuator vertically, and
an R-axis stage and a T-axis stage adjusting an inclination of the actuator.

3. The coma aberration correcting apparatus according to claim 1, wherein the holding unit comprises:
a holding part holding the actuator by a magnetic force, and
a cylinder unit adjacent to the holding part and controlling the magnetic force of the holding part.

4. The coma aberration correcting apparatus according to claim 3, wherein the optical system comprises:
a low magnification camera, and
a high magnification camera having a magnification higher than the low magnification camera, wherein the low and high magnification cameras magnify and photograph the beam emitted from the photo diode through the objective lens of the actuator.

5. The coma aberration correcting apparatus according to claim 4, wherein the controller
controls the X-axis and Y-axis stages until the low magnification camera captures the beam,
controls the X-axis and Y-axis stages to centrally photograph the beam using the low magnification camera,
controls the Z-axis stage to photograph the beam using a low magnification of the low magnification camera,
controls the X-axis and Y-axis stages to centrally photograph the beam using the high magnification camera,
controls the Z-axis stage to photograph the beam using a maximum brightness of the high magnification camera, and
controls the R-axis and T-axis stages to photograph the beam using a minimum coma aberration of the high magnification camera.

6. The coma aberration correcting apparatus according to claim 5, wherein
the beam images having the minimum coma aberration and the beam image having some coma aberration are captured by the high magnification camera.

7. The coma aberration correcting apparatus according to claim 2, wherein the holding unit comprises:
a holding part holding the actuator by a magnetic force, and
a cylinder unit adjacent to the holding part and controlling the magnetic force of the holding part.

8. The coma aberration correcting apparatus according to claim 7, wherein the optical system comprises:
a low magnification camera, and
a high magnification camera, wherein the low and high magnification cameras magnify and photograph the beam emitted from the photo diode through the objective lens of the actuator.

9. The coma aberration correcting apparatus according to claim 8, wherein the controller
controls the X-axis and Y-axis stages until the low magnification camera captures the beam,
controls the X-axis and Y-axis stages to centrally photograph the beam using the low magnification camera,
controls the Z-axis stage to photograph the beam using a low magnification of the low magnification camera,
controls the X-axis and Y-axis stages to centrally photograph the beam using the high magnification camera,
controls the Z-axis stage to photograph the beam using a maximum brightness of the high magnification camera, and
controls the R-axis and T-axis stages to photograph the beam using a minimum coma aberration of the high magnification camera.

10. The coma aberration correcting apparatus according to claim 9, wherein
the beam images having the minimum coma aberration and the beam image having some coma aberration are captured by the high magnification camera.

11. The coma aberration correcting apparatus according to claim 1, wherein the driving part comprises:
driving motors to adjust the position of the actuator to the optical pickup main body.

12. The coma aberration correcting apparatus according to claim 1, further comprising:
a pair of projections operably connected to the actuator when the optical pickup main body is supported by the main supporting unit, and
a through hole through which the holding unit passes to hold the actuator.

13. The coma aberration correcting apparatus according to claim 1, wherein the driving part is provided under the holding unit and is connected to the controller using cables and controlled to adjust the position of the actuator and a position of the objective lens mounted on the actuator.

14. The coma aberration correcting apparatus according to claim 2, wherein the controller is coupled to the X-axis, Y-axis, Z-axis, and R-axis stages using cables to control the driving part to correct the coma aberration of the objective lens.

15. The coma aberration correcting apparatus according to claim 14 further comprising:
a low magnification camera photographing the beam, wherein the controller processes the beam photographed by the low magnification camera and controls the X-axis and Y-axis stages until the beam emitted from the photo diode through the objective lens of the actuator is captured by the low magnification camera.

16. The coma aberration correcting apparatus according to claim 15, wherein the controller controls the X-axis, Y-axis, and Z-axis stages to adjust a focus and a position of the beam photographed by the low magnification camera.

17. The coma aberration correcting apparatus according to claim 16, further comprising:
- a high magnification camera photographing the beam, wherein the controller processes the beam photographed by the high magnification camera, controls the X-axis, Y-axis, and Z-axis stages to finely adjust a focus and a position of the beam from the photo diode, and controls the R-axis and T-axis stages to correct the coma aberration based on the beam photographed by the high magnification camera.

18. The coma aberration correcting apparatus according to claim 17, wherein the a beam image having the minimum zero coma aberration and a beam image having some coma aberration are captured by the high magnification camera.

19. The coma aberration correcting apparatus according to claim 1, wherein the controller comprises a computer having a control program to control the controller to correct the coma aberration.

20. A coma aberration correcting apparatus of an optical pickup including an optical pickup main body having a photo diode, and an actuator mounted on an objective lens focusing a beam emitted from the photo diode onto a recording medium, the coma aberration correcting apparatus comprising:
- a driving part adjusting in an automated manner and without human intervention a position of the actuator relative to the optical pickup main body; and
- a controller controlling the driving part to correct the coma aberration of the objective lens by calculating a coma aberration value based on a centroid difference between beam images having minimum coma aberration and a beam image having some coma aberration, where the beam images having the minimum coma aberration and the beam image having some coma aberration are captured by an optical system, and determining whether the actuator passes inspection by comparing the calculated coma aberration value with a predetermined reference value.

21. A coma aberration correcting apparatus of an optical pickup including an optical pickup main body having a photo diode, and an actuator mounted on an objective lens focusing a beam emitted from the photo diode onto a recording medium, the coma aberration correcting apparatus comprising:
- a main supporting unit detachably supporting the optical pickup main body;
- a holding unit holding and releasing the actuator on the optical pickup main body supported by the main supporting unit, the holding unit comprising a holding part holding the actuator by a magnetic force, and a cylinder unit adjacent to the holding part and controlling the magnetic force of the holding part;
- an optical system magnifying and photographing the beam emitted from the photo diode through the objective lens of the actuator held by the holding unit, the optical system comprising a low magnification camera, and a high magnification camera having a magnification higher than the low magnification camera, wherein the low and high magnification cameras magnify and photograph the beam emitted from the photo diode through the objective lens of the actuator;
- a driving part adjusting a position of the actuator relative to the optical pickup main body; and
- a controller controlling the driving part to correct the coma aberration of the objective lens, by calculating a coma aberration value based on a centroid difference between beam images having the minimum coma aberration and a beam image having some coma aberration, where the beam images having the minimum coma aberration and the beam image having some coma aberration are captured by the high magnification camera, and determining whether the actuator passes inspection by comparing the calculated coma aberration value with a predetermined reference value, and wherein the controller
- controls the X-axis and Y-axis stages until the low magnification camera captures the beam,
- controls the X-axis and Y-axis stages to centrally photograph the beam using the low magnification camera,
- controls the Z-axis stage to photograph the beam using a low magnification of the low magnification camera,
- controls the X-axis and Y-axis stages to centrally photograph the beam using the high magnification camera,
- controls the Z-axis stage to photograph the beam using a maximum brightness of the high magnification camera, and
- controls the R-axis and T-axis stages to photograph the beam using a minimum coma aberration of the high magnification camera.

* * * * *

UNITED STATES PATENT AND TRADEMARK OFFICE
CERTIFICATE OF CORRECTION

PATENT NO. : 7,301,861 B2 Page 1 of 1
APPLICATION NO. : 10/691545
DATED : November 27, 2007
INVENTOR(S) : Jae-hyun Jung et al.

It is certified that error appears in the above-identified patent and that said Letters Patent is hereby corrected as shown below:

Column 10, Line 57, in Claim 15, after "14" insert --,--.

Signed and Sealed this

Thirteenth Day of May, 2008

JON W. DUDAS
*Director of the United States Patent and Trademark Office*